United States Patent [19]

Ehl et al.

[11] Patent Number: 4,474,609

[45] Date of Patent: Oct. 2, 1984

[54] RECRYSTALLIZATION-RESISTANT MONOAZO PIGMENT MIXTURES OF HIGH TINCTORIAL STRENGTH, PROCESS FOR THEIR PREPARATION AND THEIR USE

[75] Inventors: Klaus Ehl, Frankfurt am Main; Reinhold Deubel, Bad Soden am Taunus, both of Fed. Rep. of Germany

[73] Assignee: Hoechst AG., Frankfurt am Main, Fed. Rep. of Germany

[21] Appl. No.: 474,517

[22] Filed: Mar. 14, 1983

Related U.S. Application Data

[63] Continuation of Ser. No. 364,767, Apr. 2, 1982, abandoned, which is a continuation of Ser. No. 104,778, Dec. 18, 1979, abandoned.

[30] Foreign Application Priority Data

Dec. 20, 1978 [DE] Fed. Rep. of Germany ....... 2854974

[51] Int. Cl.$^3$ .................... C09D 5/00; C09D 11/02; D06P 1/642
[52] U.S. Cl. .................... 106/288 Q; 106/308 Q; 106/309; 260/193; 260/208
[58] Field of Search ............... 260/193, 208; 106/288 Q, 308 Q, 309

[56] References Cited

U.S. PATENT DOCUMENTS

| | | | |
|---|---|---|---|
| 2,261,626 | 11/1941 | Lang | 260/193 X |
| 3,120,508 | 2/1964 | Braun et al. | 260/208 |
| 3,725,101 | 4/1973 | Kuhne et al. | 106/288 Q |
| 3,754,958 | 8/1973 | Giambalvo | 106/288 Q |
| 3,759,731 | 9/1973 | Kuhne et al. | 106/288 Q |
| 4,057,436 | 11/1977 | Davies et al. | 106/288 Q |
| 4,171,983 | 10/1979 | Farmer et al. | 106/22 |

FOREIGN PATENT DOCUMENTS

| | | | |
|---|---|---|---|
| 2,012,153 | 12/1971 | Fed. Rep. of Germany | 260/193 |
| 45-11026 | 4/1970 | Japan | 260/193 |
| 1356254 | 6/1974 | United Kingdom | 260/193 |
| 1425522 | 2/1976 | United Kingdom | 260/193 |

*Primary Examiner*—Floyd D. Higel
*Attorney, Agent, or Firm*—Curtis, Morris & Safford

[57] ABSTRACT

By coupling diazotized amines of the benzene series onto acetoacetic acid arylides, in which process more than one diazo and/or coupling component is applied and from 0.1 to 20 molar % of the diazo and/or coupling component contain acid groups, and by subsequently reacting the reactive acid groups of the product obtained by coupling with cation-active quaternary compounds, recrystallization-resistant monoazo pigment mixtures are obtained which are suitable for the preparation of varnishes, printing inks, and oily and aqueous compositions.

7 Claims, No Drawings

RECRYSTALLIZATION-RESISTANT MONOAZO PIGMENT MIXTURES OF HIGH TINCTORIAL STRENGTH, PROCESS FOR THEIR PREPARATION AND THEIR USE

This application is a continuation of application Ser. No. 364,767 filed Apr. 2, 1982 (now abandoned), which was a continuation of application Ser. No. 104,778 filed Dec. 18, 1979 (now abandoned).

It is known that a great number of pitments can be prepared by coupling diazonium salts of aromatic amines with coupling components from the series of acetoaetic acid arylamides. Said pigments are widely used in the graphics trade, and in paints and varnishes, as well as in textile pigment printing.

However, pigments of this kind show a certain solubility in some orgainc solvents or solvent-containing binding agents, which can adversely affect their applicability. Thus, for example, for some pigments upon dispersing in varnish binding agents the tinctorial strength increases at first as the dispersing period increases, but after showing a maximum intensity it clearly decreases. This process is even accelerated by a rise in temperature and mechanical stress, for example by stirring or grinding in a bead mill. Also, the tinctorial strength decreases upon storing the ready-made varnish, again in an especially rapid manner with rising temperatures. The loss in tinctorial strength is in most cases accompanied by a decreasing transparency, and frequently also by an alteration of the shade.

The factor responsible for these undesirable processes in the preparation and storage of those varnishes is the recrystallization of the dispersed pigment particles in the solvents present. Owing to known physical laws, especially the small particles having a high surface energy are dissolved, whereas the larger particles already present are still growing in compliance with the solubility conditions. The resulting grain coarsening finally leads to a loss in tinctorial strength and a reduced transparency.

As solvents effecting the above-mentioned recrystallization there are to be mentioned in practice above all aromatic hydrocarbons, such as toluene and xylenes, but also aliphatic hydrocarbons, and said effects can be observed even in aqueous media. In some cases, even the storage of the pigments for several days in the form of aqueous press cakes causes a distinct loss in tinctorial strength. Also an increased temperature of the wash water when washing the pigment press cakes may sometimes lead to a reduced tinctorial strength.

In German Pat. No. 2 012 153 it has already been described that mixed coupling reactions with coupling components containing polar groups can improve the recrystallization stability of monoaza pigments to organic solvents, especially in printing inks. Yet only an insufficient solvent stability is often obtained in this process, too, especially in the case of varnish binding agents.

In published Japanese Patent Application No. 45-11026, mixed coupling reactions with sulfo-groups-containing components have been described, wherein the products were laked with alkaline earth metal salts or organic amines, in order to reduce the viscosity in nitrocellulose binding agents. However, the laking with alkaline earth metals does not distinctly alter the recrystallization stability, and the treatment with amines results in extremely transparent products having a poor fastness to light, and insufficient hiding power of the full shade varnish and a recrystallization stability that is only moderate.

In contradistinction thereto, an aspect of the present invention comprises particularly recrystallization-resistant pigment mixtures of high tinctorial strength, i.e. monoazo pigment mixtures which can be obtained by coupling diazotized amines of the benzene series onto acetoacetic acid arylamides, in which process more than one diazo and/or coupling component is applied and from 0.1 to 20, preferably from 0.5 to 10, specially from 0.5 to 5 molar % of the diazo and/or coupling component contain acid groups, preferably sulfo and/or carboxy groups, and by subsequently reacting the reactive acid groups of the product obtained by coupling with cation-active quaternary compounds, especially quaternary ammonium or phosphonium compounds.

Another aspect of the invention is a process for the preparation of such mixtures, in which diazotized amines of the benzene series are coupled onto acetoacetic acid arylamides, wherein use is made of more than one diazo and/or coupling component and from 0.1 to 20 molar % of the diazo and/or coupling components contain acid groups, which comprises reacting the reactive acid groups of the product obtained by coupling with cationic quaternary compounds.

Yet another apect of the invention is the use of the above-mentioned monoazo pigment mixtures for the pigmenting of colorless substrates, especially for the preparation of varnishes, printing inks, and oily and aqueous compositions, wherein the pigmented substrates thus obtained are marked by considerably improved fastness to storage and elevated temperature as well as by a high tinctorial strength.

The following passages give a detailed description of preferred embodiments of the invention.

According to preferred embodiments, either mixtures of diazonium compounds of amines of the benzene series, which partly contain acid groups, such as carboxylic acid or sulfonic acid groups, and in which the proportion of the amines containing the polar groups mentioned is from about 0.5 to 10 molar %, are coupled with coupling components from the series of the acetoacetic acid arylamides or mixtures of the same in a molar ratio of about 1:1, or diazonium compounds of amines of the benzene series or mixtures of the same mixtures of coupling components from the series of the acetoacetic acid arylamides, which partly contain acid groups, such as carboxylic acid or sulfonic acid groups, and in which the proportion of the coupling components containing the polar groups mentioned is from about 0.5 to 10 molar %, are coupled in a molar ratio of about 1:1, and thereafter the acid groups—as far as they are present at the surface of the pigment crystals and can be reacted chemically—are reacted with cation-active quaternary compounds with salt formation, wherein use is made of from 0.1 to 20, preferably from 0.5 to 10, especially 0.5 to 5% by weight, of the cation-active compounds, calculated on the pigment.

Sometimes it is advantageous to add portions of compounds containing the above-mentioned polar groups to both the diazo component and the coupling component.

Thus, the pigments of the invention represent mixtures of two or more azo compounds, wherein part of these compounds contains acid groups, especially carboxylic acid or sulfonic acid groups, and the freely accessible and reactive acid groups have been reacted at least partly with organic cations, while forming a salt.

On the other hand, if the individual compounds having been prepared separately are mixed mechanically in the corresponding molar ratios, for example by grinding, and are subsequently treated with cationic quatrnary compounds, pigment mixtures are obtained which do not show the improvement of the properties regarding the general use of the same, as this is the case with the pigment mixtures prepared according to the invention.

Suitable amines of the benzene series are the derivatives of 2-nitroaniline and 4-nitroaniline which may also be substituted by one or several groups, such as halogen atoms, methyl, trifluoromethyl or methoxy groups or by further nitro groups, as well as the mono- and polyhalogen anilines.

Examples for acid group-containing amines of the benzene series are the isomeric aminobenzene-sulfonic acids optionally substituted by further groups, such as halogen atoms, trifluoromethyl gruops, methyl groups and nitro groups, to mention in particular 2-aminobenzene-sulfonic acid, 3-aminobenzene-sulfonic acid, 4-aminobenzene-sulfonic acid, 3-nitro-4-aminobenzene-sulfonic acid and 2-amino-4-chlorobenzene-sulfonic acid, furthermore the isomeric aminobenzoic acids which may also be substituted by additional groups, such as halogen, trifluoromethyl, methyl and/or nitro groups.

From the series of th acetoacetic acid arylamides there are to be mentioned, for example, acetoacetylamino-benzene, 2-actoacetylamino-toluene, 4-acetoacetylamino-toluene, 2-acetoacetyl-amino-anisole, 4-acetoacetylamino-anisole, 2-acetoacetylamino-phenetole, 4-acetoacetylamino-phenetole, 1-acetoacetylamino-2, 4-dimethyl-benzene, 1-acetoacetylamino-2,4-dimethoxy-benzene, 1-acetoacetylamino-2, 5-dimethoxybenzene, 1-acetoacetylamino-2, 5-dichlorobenzene, 1-acetoacetylamino-2,5-dimethoxy-4-chlorobenzene, 5-chloro-2-acetoacetylamino-toluene and 3-chloro-4-acetoacetylamino-toluene.

As examples for coupling components from the series of the acetoacetic acid arylamide derivatives having acid groups there may be mentioned: 2-Acetoacetylamino-benzoic acid, 3-acetoacetylamino-benzoic acid, 4-acetoacetylamino-benzoic acid, 2-acetoacetylamino-toluene-4-carboxylic acid, 3-acetoacetylamino-toluene-4-carboxylic acid, 2-chloro-4-acetoacetylamino-benzoic acid, 3-chloro-4-acetoacetylamino-benzoic acid, 1-acetoacetylamino-benzene-3,5-dicarboxylic acid, 4-acetoacetylaminophenyl-acetic acid, 2-acetoacetylamino-benzene-sulfonic acid, 3-acetoacetylamino-benzene-sulfonic acid or 4-acetoacetylamino-benzene-sulfonic acid.

As cation-active quaternary compounds there may be mentioned the following examples, in which the pertinent anions may be different, depending on the mode of preparation of the cationic organic compounds, for example halide, sulfate, alkoxysulfate, alkoxyphosphate and mixtures thereof:

Permethylated tallow oil-propylene diamine, distearyldimethyl ammonium, didecyldimethyl ammonium, hexadecyltrimethyl ammonium, dicoconut oil alkyldimethyl ammonium, coconut oil alkyl-2,4-dichlorobenzyl-dimethyl ammonium, stearylbenzyldimethyl ammonium, di-β-palmitic acid isopropyl ester-dimethyl ammonium, permethylated N-stearoyldiethylene triamine, permethylated N-stearoyltriethylene tetramine, lauryl pyridinium, 2-hydroxy-5-chloro-1, 3-xylylene bispyridinium, 2-hydroxy-5-isooctyl-1, 3-xylylene-bispyridinium, 2-hydroxy-5-t-butyl-1,3-xylylene-bispyridinium, 2-hydroxy-5n-nonyl-1,3-xylylene-bispyridinium, 2-methoxy-5isooctyl-1,3-xylylene-bispyridinium, 2-hydroxy-5-isooctyl-1,3-xylylene-bisquinolinium, 2-hydroxy-5-isooctyl-1,3-xylylene-bisisoquinolinium, hexadecyl-tributyl phosphonium, ethyl-trioctyl phosphonium, tetrabutyl phosphonium.

The organic cation-active compounds may be employed in the stoichiometric ratio to the acid groups used, but also in excess or less than the stoichiometric amount. Preference is given to an amount of from 0.5 to 3% by weight, calculated on the pigment mixture.

The pigment mixtures of the invention are prepared in known manner by coupling, preferably by combining the diazonium compounds with the coupling components in an aqueous medium, an addition of interface-active wetting and dispersing agents possibly being advantageous.

The diazonium salt solutions having proportions of diazonium salts containing polar groups are obtained either by diazotizing a mixture of the corresponding arylamines in known manner or by separately diazotizing the individual arylamines and subsequently mixing the diazonium salt solutions. It is also possible to introduce different diazonium salt solutions simultaneously, but separately, directly for the coupling.

The different proportions of coupling components may either be jointly dissolved and precipitated, or dissolved separately and precipitated jointly, or dissolved separately and precipitated separately, and subsequently the suspension of the precipitated components is stirred. It is also possible, however, to add proportions of the coupling components simultaneously with the diazonium salt solution, but separately, directly during the coupling.

The pigment mixtures of the invention are treated with the cationic organic compounds either during the coupling or upon completion of the coupling in the coupling liquor, or the aqueous press cakes are treated with the cation-active compounds.

Also a blending, for example with resins, mineral oils or fatty oils, may be effected in known manner. There may also be carried out a thermal after-treatment of the coupling liquor or of the pigment press cakes according to common methods.

As compared with the corresponding pigments prepared without the addition of polar diazo and/or coupling components and without the addition of quaternary organic cations, the pigment mixtures of the invention are distinguished by a considerably improved re-crystallization behavior in varnish, in aqueous systems and in the drying of the pigments following the preparation. This feature results in an excellent fastness to storage, which is important above all for the storing of aqueous pastes and press cakes and for the dispersing of the pigments, for example in varnish binding agents at elevated temperatures, as they occur normally in bead mills or similar dispersing aggregates.

Besides, the pigment mixtures of the invention show a very high tinctorial strength, an excellent dispersibility and a high gloss in varnish coatings.

The process of the invention is further illustrated by the following Examples. The parts, ratios and percentages given in the following relate to the weight.

EXAMPLE 1

34.5 Parts of 4-chloro-2-notroaniline and 0.22 part of 2-nitroaniline-4-sulfonic acid are stirred for several hours in 100 parts of 5N hydrochloric acid. Subsequently, ice is added to the mixture and 34.7 parts of 40% sodium nitrite solution are added dropwise. Upon clarification of the diazonium salt solution thus obtained, if necessary by adding a filtering aid, the excess nitrite is destroyed by adding a sufficient amount of amidosulfonic acid.

43.25 Parts of acetoacetic acid-2-chloro-anilide are introduced, while stirring, into a mixture of 800 parts of water, 4 parts of glacial acetic acid and 8.1 parts of 33% sodium hydroxide solution.

At a temperature of from 10° to 20° C. within 2 hours coupling is effected by allowing the diazonium salt solution to run below the surface of the suspension of the coupling component. During this time the pH value of the coupling liquor is maintained at 4 to 5.5 by adding 6% sodium hydroxide solution. Upon completion of coupling there are added 2 parts of a mixture of permethylated N-stearoyl-diethylene-triamine chloride and permethylated N-stearoyl-triethylene-tetramine chloride (mixing ratio 3:1); the resulting mixture is heated to 60° C., filtered, washed with water and dried at 70° C. in a circulating air drier. After grinding, a yellow pigment powder is obtained.

EXAMPLE 1a

A comparative pigment is prepared according to the procedure of Example 1, with the exception that the mixture of permethylated N-stearoyl-diethylene-triamine chloride and permethylated N-stearoyl-triethylene-tetramine chloride is not added. EXAMPLE 1b A comparative pigment is prepared according to the procedure of Example 1, with the exception that nitroaniline-4-acid is not added.

EXAMPLE 1c

A comparative pigment is prepared according to the procedure of Example 1, with the exception that neither the mixture of permethylated N-stearoyl-diethylene-triamine chloride and permethylated N-stearoyl-triethylene-tetramine chloride nor the 2-nitroaniline-4-sulfonic acid is added

EXAMPLE 1d

A comparative pigment is prepared according to the procedure of Example 1, with exception that after coupling a mixture of N-stearoyl-diethylene-triamine hydrochloride and N-stearoyl-triethylene-tetramine hydrochloride are added instead of quaternary ammonium salts.

In the following, for convenience the products of the Examples are designated by their respective Example numbers.

In order to subject the recrystallization stability of the products to a test reflecting performance in actual practice, the pigments are dispersed in an alkyd resin varnish at 30° and 80° C. by means of a paint shaker. Products 1b and 1c lose about 55% of their tinctorial strength at the elevated temperature which may be obtained by grinding at 30° C. Products 1a and 1d lose about 30% whereas product 1 suffers a loss of less than 5% of its tinctorial strength. Besides, product 1d shows an undesirably high transparency in the full shade varnish.

By storing the corresponding varnishes at elevated temperatures over a prolonged period of time, the extremely high recrystallization stability of product 1 is also demonstrated. Moreover, this product shows a considerably higher tinctorial strength (for example 65:100 in aqueous preparations as compared with product 1c) and an excellent dispersibility.

EXAMPLE 2

Example 1b is repeated with the exception that 0.45 part of N-acetoacetyl-anthranilic acid is added to the coupling component prior to coupling. The recrystallization stability and the tinctorial strength of the product respond to those reported in Example 1.

EXAMPLE 2a

The coupling is carried out as has been described in Example 2, with the exception that the mixture of permethylated N-stearoyl-diethylene-triamine chloride and permethylated N-stearoyl-triethylene-tetramine chloride is not added. The recrystallization stability is reduced drastically (loss in tinctorial strength of about 30% by grinding in the paint shaker at 80° C.).

EXAMPLE 3

A preparation is formed by adding to a mixed coupling product (still in the coupling liquor) produced in accordance with Example 1a 2 parts of permethylated tallow oil-propylene diamine chloride. The recrystallization stability corresponds to that of Example 1.

EXAMPLE 4

A mixture of products obtained by coupling produced according to the procedure of Example 2a is blend, while still in the coupling liquor, with 2 parts of permethylated tallow oil-propylene diamine chloride. The pigment mixture obtained exhibits a recrystallization stability which is comparable to that of the product of Example 1.

EXAMPLE 5

A pigment is prepared according to the procedure of Example 1 with the exception that 0.5 part of sulfanilic acid is employed instead of 2-nitroaniline-4-sulfonic acid.

In this case, too, a comparative pigment mode without the addition of the mixture of permethylated N-stearoyl-diethylene-triamine chloride and permethylated N-stearoyl-triethylene-tetramine chloride (and hence obtained according to the procedure of Example 1a shows a recrystallization stability which has been considerably reduced.

EXAMPLE 6

The coupling of the pigment is effected according to the procedure of Example 1a, with the exception that 0.45 part of N-acetoacetyl-anthranilic acid are mixed with the coupling component prior to coupling. The recrystallization stability is improved as compared with that of the product of Example 1c; recrystallization stability of the products of the following Examples 6a to 6j is drastically increased by inclusion of the additives indicated therein which have been admixed after the coupling.

EXAMPLE 6a

2 Parts of a mixture of permethylated N-stearoyl-diethylene-triamine chloride and permethylated N- stearoyltriethylene-tetramine chloride (mixing ratio 3:1).

EXAMPLE 6b

2 Parts of permethylated tallow oil-propylene diamine chloride.

EXAMPLE 6c

2 Parts of N-lauryl-pyridinium chloride.

EXAMPLE 6d

2 Parts of 2-hydroxy-5-isooctyl-1,3-xylylene-bis-pyridinium chloride.

EXAMPLE 6e

2 Parts of 2-methoxy-5-isooctyl-1,3-xylylene-bis-pyridinium chloride.

EXAMPLE 6f

2 Parts of 2-hydroxy-5-isooctyl-1,3-xylylene-bis-quinolinium chloride.

EXAMPLE 6g

2 Parts of 2-hydroxy-5-isooctyl-1,3-xylylene-bisisoquinolinium chloride.

EXAMPLE 6h

2 Parts of hexadecyltributyl-phosphonium bromide.

EXAMPLE 6i

2 Parts of ethyltrioctyl-phosphonium bromide.

EXAMPLE 6j

2 Parts of tetrabutyl-phosphonium bromide.

EXAMPLE 7

17.3 Parts of 4-chloro-2-nitroaniline and 0.22 part of 2-nitroaniline-4-sulfonic acid are stirred for several hours in 40 parts of water and 30.4 parts of 31% hydrochloric acid. Subsequently, ice is added to the mixture and within 30 minutes 17.4 parts of 40% sodium nitrite solution are added dropwise at 0 to 18° C. Upon clarification of the resulting diazonium salt solution (while adding, if necessary, a filtering aid) the excess nitrite is removed by adding a sufficient amount of amidosulfonic acid.

23.7 Parts of acetoacetic-5-chloro-2-toluidide are stirred in 200 parts of water and then dissolved by adding 20.4 parts of 33% sodium hydroxide solution and thereafter precipitated at 12° to 15° C. by adding dropwise 11 parts of glacial acetic acid.

At 30° C. and within 2 hours the coupling is effected by allowing the diazonium salt solution to run below the surface of the suspension of the coupling component. Upon completion of the coupling there is added 1 part of a mixture of permethylated N-stearoyl-diethylene-triamine chloride and permethylated N-stearoyl-triethylene-tetramine chloride (mixing ratio 3:1); the resulting mixture is heated to 60° C., filtered, washed with water and dried at 70° C. in a circulating air drier. After grinding, a yellow pigment powder is obtained.

EXAMPLE 7a

Reaction is carried out as has been described in Example 7, with the exception that the quaternary ammonium salts are not added.

EXAMPLE 7b

Reaction is carried out as has been described in Example 7, with the exception that 2-nitroaniline-4-sulfonic acid is not added.

EXAMPLE 7c

As a modification of Example 7, a comparative pigment is prepared by the Example 7 procedure except that 2-nitroaniline-4-sulfonic acid and the quaternary ammonium salts are not added.

When testing the recrystallization stability according to Examples 1 to 1c, there is found a distinct improvement of the stability of product 7 as compared with 7a. Products 7b and 7c are again far less resistant than product 7a and are approximately equal to each other.

EXAMPLE 8

16.8 Parts of 5-nitro-2-amino-anisole and 0.22 part of 2-nitro-aniline-4-sulfonic acid are stirred for several hours in a mixture of 40 parts of water and 30.4 parts of 31% hydrochloric acid. Subsequently 100 parts of ice are added to the mixture and then 17.4 parts of 40% sodium nitrite solution are introduced within 5 minutes below the surface of said mixture. Stirring is continued for about 2 hours at a temperature of from 0° to 10° C., whereupon the mixture is clarified, after having added 1.5 parts of kieselguhr.

21.3 Parts of acetoacetic acid-o-anisidide are stirred in 300 parts of water and dissolved by adding 20 parts of 33% sodium hydroxide solution. The product is precipitated with 6 parts of glacial acetic acid and adjusted to a pH of 5 by means of 15 parts of 31% hydrochloric acid.

The coupling is carried out at 5° to 10° C. by allowing the diazonium salt solution to run below the surface of the suspension of the coupling component, while the pH is maintained at 5 by adding about 100 parts of 6% sodium hydroxide solution. The preparation with 1 part of ammonium salt mixture and the processing are effected in accordance with Example 7.

EXAMPLE 8a

The reaction is carried out as has been described in Example 8, with the exception that the quaternary ammonium salts are not added.

EXAMPLE 8b

The reaction is carried out as has been described in Example 8, however without adding 2-nitroaniline-4-sulfonic acid.

EXAMPLE 8c

As a modification of Example 8, a comparative pigment is prepared by the Example 8 procedure except that 2-nitroaniline-4-sulfonic acid and the quaternary ammonium salts are not added.

When testing the recrystallization stability as set forth for Examples 1 to 1c, products 8b and 8c are least stable, product 8a is slightly better, and the pigment obtained according to Example 8 shows an excellent stability.

EXAMPLE 9

If in the procedures of Examples 8 to 8c the 5-nitro-2-amino-anisole is replaced by 3-nitro-4-amino-anisole, a pigment series is obtained which shows a comparable graduation of stability.

EXAMPLE 10

A mixture of 17.3 parts of 4-chloro-2-nitroanisole and 0.22 part of 2-nitroaniline-4-sulfonic acid is diazotized and clarified as has been described in Example 7.

A suspension of 21.3 parts of acetoacetic acid-o-anisidide is prepared as has been described in Example 8.

The coupling is carried out at 20° C. by allowing the diazonium salt solution to run below the surface of the suspension of the coupling component. The pH value is maintained at 4 to 4.5 by adding sodium hydroxide solution. The preparation with 1 part of ammonium salt mixture and the work-up are carried out in accordance with Example 7.

EXAMPLE 10a

The reaction is carried out as has been described in Example 10, with the exception that the quanternary ammonium salts are not added.

EXAMPLE 10b

The reaction is carried out as has been described in Example 10, with the exception that 2-nitroaniline-4-sulfonic acid is not added.

EXAMPLE 10c

As a modification of Example 10, a comparative pigment is prepared by the Example 10 producedure except that 2-nitroaniline-4-sulfonic acid and the quaternary ammonium salts are not added.

When testing the recrystallization stability as set forth for Examples 1 to 1c, product 10c show the least effect. Product 10a is somewhat more stable, and the pigment prepared according to Example 10 shows an excellent stability.

EXAMPLE 11

A mixture of 33.7 parts of 3-nitro-4-amino-anisole and 0.44 part of o-nitroaniline-p-sulfonic acid is stirred in 100 parts of 5N hydrochloric acid for several hours. Subsequently 100 parts of ice are added to the mixture and 34.7 parts of 40% sodium nitrite solution are introduced dropwise. The resulting diazonium salt solution is clarified, while adding 0.5 part of kieselguhr and 1 of bleaching earth.

39 Parts of acetoacetic acid-o-toluidide are introduced by stirring into 800 parts of water, dissolved by adding 27.2 parts of 33% sodium hydroxide solution and precipitated again with 5 parts of sodium acetate.

The coupling is carried out at 30° C. within 2 hours by allowing the diazonium salt solution to run below the surface of the suspension of the coupling component. The pH is maintained at 6 by simultaneously adding 6% sodium hydroxide solution. The preparation with 2 parts of ammonium salt mixture and the work-up are effected as has been described in Example 1.

EXAMPLE 11a

The reaction is carried out as has been described in Example 11, with the exception that quaternary ammonium salts are not added.

EXAMPLE 11b

The reaction is carried out as has been described in Example 11, with the exception that 2-nitroaniline-4-sulfonic acid is not added.

EXAMPLE 11c

As a modification of Example 11, a comparative pigment is prepared by the Example 11 procedure except that 2-nitroaniline-4-sulfonic acid and the quaternary ammonium salts are not added.

When testing the recrystallization stability as set forth for Examples 1 to 1c, products 11b and 11c prove to be less stable than product 11a, which is in turn far inferior to the pigment mixture prepared according to Example 11 with regard to stability.

EXAMPLE 12

A pigment is prepared according to Example 1 with the exception that 1 part of 3-nitro-4-aminobenzoic acid is used instead of 2-nitroaniline-4-sulfonic acid.

In this case, too, a comparative pigment obtained without adding the mixture of permethylated N-stearoyl-diethylene-triamine chloride and permethylated N-stearoyl-triethylene-tetramine chloride (that is, by a procedure analogous to that of Example 1a) shows a considerably poorer recrystallization stability.

EXAMPLE 13

A mixture of 31 parts of 4-chloro-2-nitroaniline and 4.36 parts of 2-nitroaniline-4-sulfonic acid is diazotized and coupled onto a suspension of 43.25 parts of acetoacetic acid-2-chloroanilide, as has been described in Example 1. After the preparation with 8 parts of the ammonium salt mixture described in Example 1, a pigment is obtained which is extremely stable to recrystallization.

EXAMPLE 14

Reaction is carried out according to the procedure of Example 13 with the exception that 8 parts of permethylated tallow oil-propylene diamine chloride are employed for the preparation. The resulting pigment mixture is also very resistant to recrystallization.

What is claimed is:

1. A recrystallization-resistant monoazo pigment mixture of high tinctorial strength obtained by coupling a diazo component comprising one or more diazotized amines of the benzene series with a coupling component comprising one or more acetoacetic acid arylamides, wherein from 0.1 to 20 contain acid groups, and by subsequently reacting the reactive acid groups of the product obtained by coupling, with one or more quaternary cation-active compounds selected from the group consisting of permethylated tallow oil-propylene diamine halides, permethylated N-stearoyl-diethylene-triamine halides, and permethylated-N-stearoyltriethylene-tetramine halides.

2. A mixture as claimed in claim 1, wherein 0.5 to 10 molar % of the diazo component or coupling component or both contain acid groups.

3. A mixture as claimed in claim 1, wherein 0.5 to 5 molar % of the diazo component or coupling component or both contain acid groups.

4. A mixture as claimed in claim 1, wherein the acid groups are sulfo groups or carboxy groups or both.

5. A mixture as claimed in claim 1, wherein the diazo component is a nitroaniline which is unsubstituted or substituted by up to three substituents selected from the group consisting of halogen, methyl, trifluoremethyl, methoxy and nitro, said substituents being identical or not all the same in the case of di- or trisubstitution.

6. A mixture as claimed in claim 1, wherein the diazo component is a mono- or polyhalogen aniline.

7. A mixture as claimed in claim 1, wherein the coupling component is unsubstituted acetoacetic acid anilide or said anilide substituted up to three substituents selected from the group consisting of halogen, methyl and methoxy, said substituents being identical or not the same in the case of di- or trisubstitution.

* * * * *

UNITED STATES PATENT AND TRADEMARK OFFICE
CERTIFICATE OF CORRECTION

PATENT NO. : 4,474,609

DATED : October 2, 1984

INVENTOR(S) : Klaus Ehl and Reinhold Deubel

It is certified that error appears in the above-identified patent and that said Letters Patent is hereby corrected as shown below:

Column 1, line 12, change "pitments" to --pigments--.
Column 1, line 15, change "acetoaetic" to -- acetoacetic --;
Column 1, line 56, change "monoaza" to -- monoazo --;
Column 3, line 30, change "th" to -- the --;
Column 3, line 32, change "2-actoacetylamino-toluene" to
 -- 2-acetoacetylamino-toluene --;

Column 4, line 6, insert a hyphen after the number "5";
Column 5, line 3, change "4-chloro-2-notroaniline" to
 -- 4-chloro-2-nitroaniline --
Column 5, line 35, "Example 1b" should be a new heading
 over line 36;
Column 5, line 37, change "nitroaniline-4-acid" to
 -- 2-nitroaniline-4-sulfonic acid --.

UNITED STATES PATENT AND TRADEMARK OFFICE
CERTIFICATE OF CORRECTION

PATENT NO. : 4,474,609

DATED : October 2, 1984

INVENTOR(S) : Klaus Ehl and Reinhold Deubel

It is certified that error appears in the above-identified patent and that said Letters Patent is hereby corrected as shown below:

Claim 1, line 6 (column 10, line 40), after "from 0.1 to 20" insert
— molar % of the diazo component or coupling component
or both —;

Claim 5, line 4 (column 10, line 58), change "trifluoremethyl" to
— trifluoromethyl —.

Signed and Sealed this

Twentieth Day of August 1985

[SEAL]

Attest:

DONALD J. QUIGG

Attesting Officer     Acting Commissioner of Patents and Trademarks